United States Patent
Far-hadian (10) Patent No.: US 9,747,576 B2
(45) Date of Patent: Aug. 29, 2017

(54) POSTAGE-FREE MAIL DELIVERY USING A MOBILE DEVICE

(71) Applicant: Farshad Jason Far-hadian, Westcliff Laguna Niguel, CA (US)

(72) Inventor: Farshad Jason Far-hadian, Westcliff Laguna Niguel, CA (US)

( * ) Notice: Subject to any disclaimer, the term of this patent is extended or adjusted under 35 U.S.C. 154(b) by 383 days.

(21) Appl. No.: 13/773,658

(22) Filed: Feb. 22, 2013

(65) Prior Publication Data

US 2014/0244536 A1 Aug. 28, 2014

(51) Int. Cl.
*G06Q 10/08* (2012.01)
*G06Q 50/32* (2012.01)

(52) U.S. Cl.
CPC ........... *G06Q 10/083* (2013.01); *G06Q 50/32* (2013.01)

(58) Field of Classification Search
CPC ........ G07B 15/00; G07B 15/02; G07B 15/06; G07B 17/00; G07B 17/00008; G07B 17/00016
USPC .................................................. 705/401–410
See application file for complete search history.

(56) References Cited

U.S. PATENT DOCUMENTS

| | | | | |
|---|---|---|---|---|
| 6,178,411 B1 * | 1/2001 | Reiter | .................... | G06Q 30/02 705/408 |
| 2004/0230542 A1 * | 11/2004 | Obrea | ........................... | 705/401 |
| 2007/0174217 A1 * | 7/2007 | Chatte | ........................... | 705/410 |
| 2008/0183329 A1 * | 7/2008 | Gilham | ............ | G07B 17/00467 700/224 |
| 2011/0071944 A1 * | 3/2011 | Heiden et al. | .................. | 705/41 |

OTHER PUBLICATIONS

Yakal, K. (2001). Electronic postage. Home Office Computing, 19(2), 67. Retrieved from https://dialog.proquest.com/professional/professional/docview/674185698?accountid=142257.*

Mail processing solution from engineering innovation and parascript selected by panhandle presort services to automate flats processing. (Mar. 14, 2011). PR Newswire Retrieved from https://dialog.proquest.com/professional/professional/docview/857213559?accountid=142257.*

* cited by examiner

Primary Examiner — Michael Harrington (57) ABSTRACT

Machines, systems and methods for delivering mail items are provided. The method comprises scanning route information, for delivery of a mail item, using a mobile communication device; generating a first unique identifier from data comprising the route information, wherein the first unique identifier identifies the mail item; recognizing a second unique identifier associated with the mobile communication device used for scanning the route information, wherein the second unique identifier identifies a user account to which delivery charges associated with delivering the mail item are applied; associating the first unique identifier and the second unique identifier so that having access to the first unique identifier as stored in a database provides access to the second unique identifier; and mailing the mail item without prepaid postage affixed to the mail item.

20 Claims, 5 Drawing Sheets

POSTAGE-FREE MAIL DELIVERY USING A MOBILE DEVICE

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to mail delivery services and, more particularly, to machines, systems and methods for tracking a piece of mail and paying for it without the use of prepaid postage.

BACKGROUND

Typically, when mailing a letter or shipping a package, the sender has to affix prepaid postage (e.g., stamps) to the item being mailed. The amount of postage due is generally calculated based on the item's weight, size, route information and the class of delivery (e.g., expedited vs. regular). If the amount of postage is not correctly calculated, the mail item may not be delivered. Thus, the sender is required to spend the time to weigh and measure the mail item, find the exact rate from a chart based on the route information and delivery class, and accordingly affix the proper amount of postage.

Some shipping services (e.g., FedEx®/UPS®) provide alternative payment methods to affixing prepaid postage to a mail item. Such methods nevertheless still require the sender to determine the exact size and weight of the package and to provide that information along with routing and delivery class data to a computer that is connected to a printer. As long as the sender has provided his billing or account information, the provided information is then embedded by way of special purpose software running on the computer into a barcode or some sort of a label that is printed by the printer.

The sender will then have to affix the printed label to the mail item and drop off the mail item in a special mail box or location. Without the label and the information embedded into the label, the package is generally undeliverable. Thus, if a sender does not have access to a computer and a printer, he is unable to ship the package. Even if the sender does have access to a computer and a printer, the process associated with having to interact with the computer to enter the needed data, and printing and fixing the label to the package are rather inconvenient, not to mention the steps involving weighing and measuring the mail item noted above.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, machines, systems and methods for delivering mail items are provided. The method comprises scanning route information, for delivery of a mail item, using a mobile communication device; generating a first unique identifier from data comprising the route information, wherein the first unique identifier identifies the mail item; recognizing a second unique identifier associated with the mobile communication device used for scanning the route information, wherein the second unique identifier identifies a user account to which delivery charges associated with delivering the mail item are applied; associating the first unique identifier and the second unique identifier so that having access to the first unique identifier as stored in a database provides access to the second unique identifier; and mailing the mail item without prepaid postage affixed to the mail item, wherein the route information is displayed on a surface of the mail item such that the route information is readable by a scanning system at a postal service processing location.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments.

Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
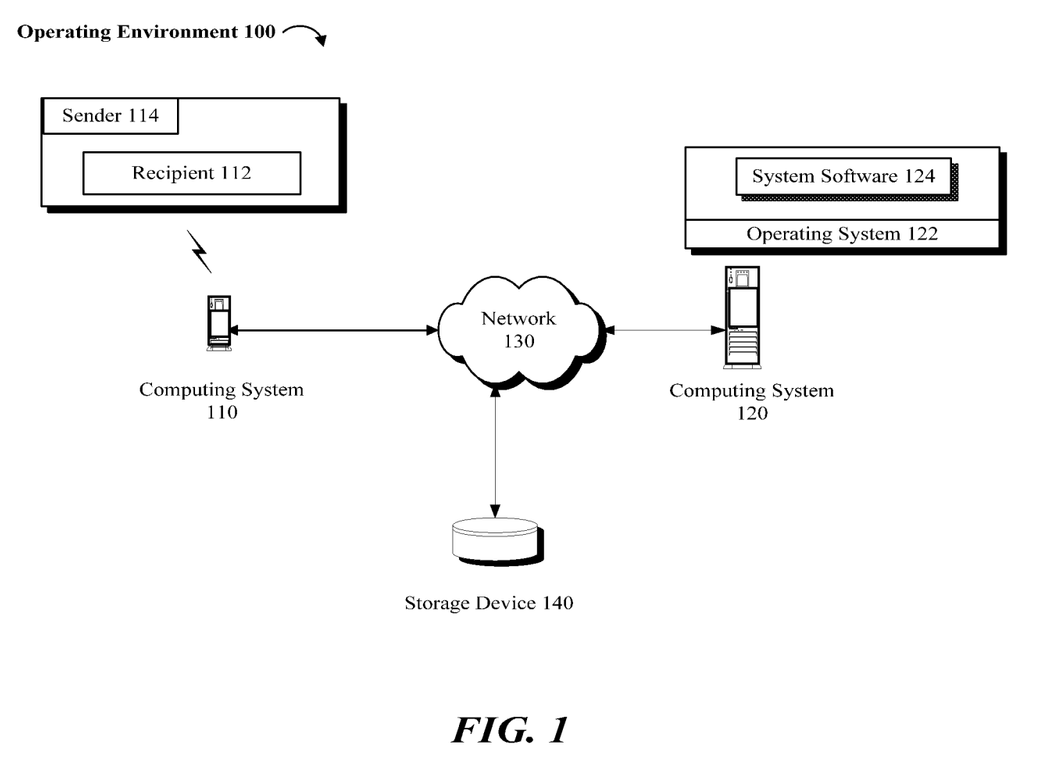
FIG. 1 illustrates an exemplary operating environment in accordance with one or more embodiments, wherein a mobile computing system equipped with an optical scanner is utilized to scan route information.

Referring to FIG. 1, an example operating environment 100 is illustrated in which a computing system 110 may be used by the sender of a package to scan route information written or printed on a package, using a scanning device (not shown). The scanning device may be a digital camera or other optical scanner and the computing system 110 may be a handheld mobile device, such as a telephony device (e.g., a smart phone), a tablet (e.g., an Apple iPad®), or other communication capable computing device. Computing system 110 may be equipped or have access to a character recognition tool (e.g., software) that recognizes printed or handwritten characters.

In accordance with one embodiment, computing system 110 may communicate over a network 130 to store data on storage device 140 or to transfer data to a computing system 120. In one implementation, storage device 140 may be local to, remote to, or embedded in computing system 110. An operating system 122 may be loaded on computing system 120. Special purpose system software 124 may be executed on top of operating system 122 to process mail according to information communicated by the computing system 110. Network 130 may be implemented over a local or wide area network—desirably over the Internet—to allow for computing system 110 communicate with computing system 120 or storage device 140 as provided in further detail below.

A sender may either handwrite or print the route information (e.g., the recipient information 112 or sender information 114) on a mail item. In some implementations, either one or both route information may optionally be printed as a code (e.g., a quick response (QR) code or a bar code). Printing the route information in code form may help provide added security to mail items that are circulated in public, because the route information (i.e., name and address of the sender or the receiver) would not be obvious to the naked eye. Additionally, the code may be encrypted so that an authorized party with a decryption mechanism is able to decrypt the code and access the routing data.

Figure 2:
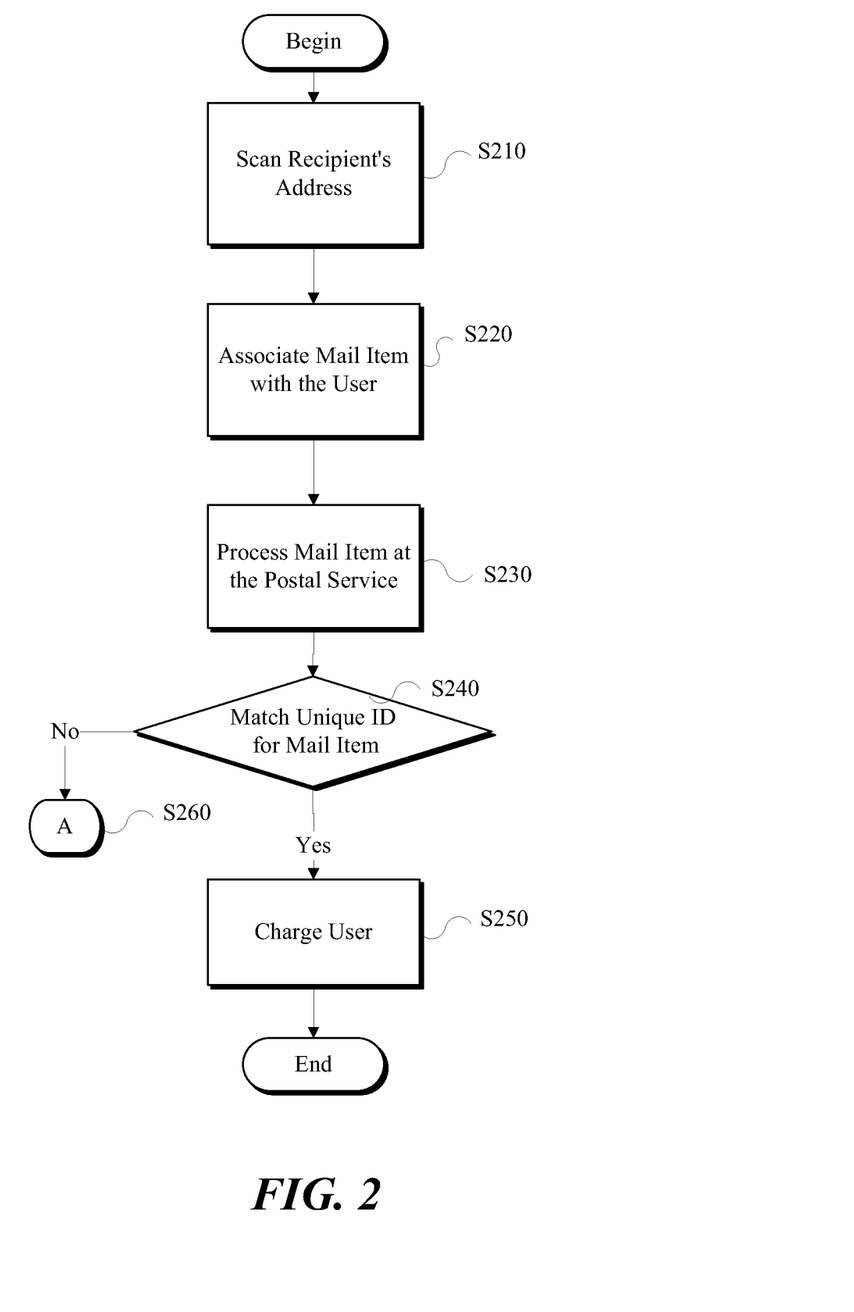
FIG. 2 is an exemplary flow diagram of a method of charging the sender of a package, in accordance with one embodiment.

Referring to FIGS. 1 and 2, a user (e.g., a sender) may scan recipient information 112 using, for example, the scanning device connected to the computing system 110 (S210). A software application, such as a user app (not shown), may be executed on computing device 110 to associate the mail item with the user (S220). Depending on implementation, different methods may be used to associate the mail item with the user. In one example implementation, the association may be established based on the recipient information 112 by way of, for example, applying an algorithm to the recipient's address (optionally, in combination with a key such as the time of scan or an ID associated with computing system 110, or both) that would generate a unique value.

The generated unique value may be used to identify the mail item. In one example, the unique value for the mail item may be association with the user. This association may be established by creating a logical link (e.g., by way of a pointer or utilization of some data structure) between a first unique value that identifies the mail item and a second unique value that identifies the user. The unique value identifying the user may be generated based on a unique identifier associated with the computing system 110. Such unique identifier may be a unique serial number (e.g., MacID), unique data stored on storage media (e.g., a cookie), or a unique ID of a component (e.g., a wireless communication chip serial number) installed or associated with computing system 110.

In one embodiment, in addition to (or instead of) scanning the recipient information 112, sender information 114 (or other data) may be scanned and used to generate the unique value associated with the mail item. Desirably, the user may have a registered account (e.g., an online account created by the user) with a postal service provider (e.g., United States Postal Service, UPS, FedEx, etc.). The registered account may be fully or partially established when the user downloads a related user app to computing system 110. The registered account includes or provides the postal service with access to the user's billing information, such that the user's account may be charged. In one implementation, when the user scans the route information, the user account is charged for at least an initial amount, for example.

Depending on implementation, the initial amount may be used as full or partial payment toward the amount due for delivery of the mail item. The method of payment may be implemented in various ways. For example, if the User app executed on computing system 110 was installed by way of an app service (e.g., Apples' App Store, Google's Play Store, etc.) then that app service may be used to collect the payment on behalf of the postal service that released the user app. The associated charge will then appear on a statement sent to the user, depending on the method of payment registered with the app service. If the user has set up a prepaid type account, the charges are immediately paid, otherwise, the charges are paid when the user sends in a payment.

In one embodiment, the initial amount is charged at the time of the scan, if the mail item being sent is, for example, a standard mail item with a known delivery charge (e.g., a regular size envelope of a certain weight may have a delivery charge of $X for normal delivery). Alternatively, the user may enter a particular value to be charged to his account by interacting with a user interface menu rendered on the computing system 110 by the user app. If at the time of scanning the route information, the user does not know what the proper charge would be for mailing the mail item, then the user may select an option to allow the mail value to be determined at a later time and charged to the user's account as provided in further detail below.

Accordingly, in one embodiment, a user after printing or writing the route information on the mail item and scanning the requisite route information, may place the mail item in a mail box or drop the mail item off at a designated location without affixing any prepaid postage or special label. It is noteworthy that when the route information on a mail item is scanned, by the user using the user app on computing system 110, the mail item is associated with the user based on the unique identifier of the mail item. The unique identifier of the mail item may be associated with a unique identifier of the computing system 110, as noted earlier. The association between unique identifier for the mail item and the unique identifier for the computing system 110 may be stored in a database in a storage device 140, for example, such that system software 124 may have access to it.

When the mail item is received at the post office or other courier service office processing center, the mail item is processed (S230). As a part of processing the mail item, the route information on the mail item may be scanned by scanners located at the post office mail processing center, for example. The scanners at the mail processing center may, depending on implementation, scan the route information (i.e., the recipient information 112 or the sender information 114) and use an algorithm to derive a unique identifier for the mail item (e.g., based on the route information) in the same manner as the user app installed on computing system 110 was used to calculate the unique identifier during the scan process performed by the user. It is noteworthy that installation of the user app on computing system 110 may also result in the registration of the unique identifier associated with the computing system 110 with the postal service.

At the postal service, the process of calculating the unique identifier for the mail item may be performed by system software 124 running on computing system 120, for example. A proxy service other than the postal service may be also able to perform the same tasks using system software 124. The unique identifier for the mail item as calculated by system software 124 may be then compared with the unique identifier for the mail item as calculated by the user app running on computing system 110 at the time of the user's initial scan. As suggested earlier, the unique identifier for the mail item may be stored in a database in storage device 140, for example. Thus, in one embodiment, it is determined whether the unique identifier for the mail item as calculated by system software 124 (e.g., at the postal service) has a match with a unique identifier for a mail item stored in storage device 140.

Referring back to FIG. 2, if the unique identifier for the mail item as calculated by system software 124 has a match with a unique identifier for a mail item stored in storage device 140, then a user account that is to be charged for the mail delivery costs may be identified (e.g., based on the association between the unique identifier for the mail item and the unique identifier for the computing system 110, according to data recorded in the database stored in storage device 140). The unique identifier for the computing system 110 is then matched with a user account registered with the postal service and the user is charged for the delivery cost of the mail item (S250). If no match is found in the database in storage device 140 for the unique identifier calculated for the mail item, then the mail item may be rejected because the delivery fee for the mail item cannot be charged to a user account (S260).

According to the above process, advantageously, a user or a sender may relatively effortlessly mail an envelope or a package without having to go through the inconvenience of purchasing postage from the post office, weighing and measuring the mail item, and affixing postage to the mail item before the user is able to mail it. The above process, in certain embodiments, also obviates the need for using special purpose software for printing proprietary mailing labels, which require the use of a computer and a printer. As provided herein, as an improvement over the current systems, a sender may simply use a user app on a mobile device to scan the route information and mail an item without affixing any postage, or having to measure or weigh the item, or having to look up shipping costs according to some arcane process that is error prone.

When the package is received at the postal service processing center, the package is weighed and measured. The route information for the package may be determined when the sender information 114 and recipient information 112 are scanned at the processing center. The associated charges for the delivery of the mail are calculated at the postal service processing center (or by a proxy service) and the charges are billed to the user who is identified in association with the mail item. The above process substantially reduces the inconvenience to the user and also reduces and potentially eliminates the overhead associated mail verification process at the postal office processing centers. That is, the costs for delivering a mail item are calculated by the postal service and charged to the user when the route information for the mail item is scanned. Thus, the need for comparing the calculated delivery costs with the value of attached prepaid stamps or labels is obviated.

Figure 3:
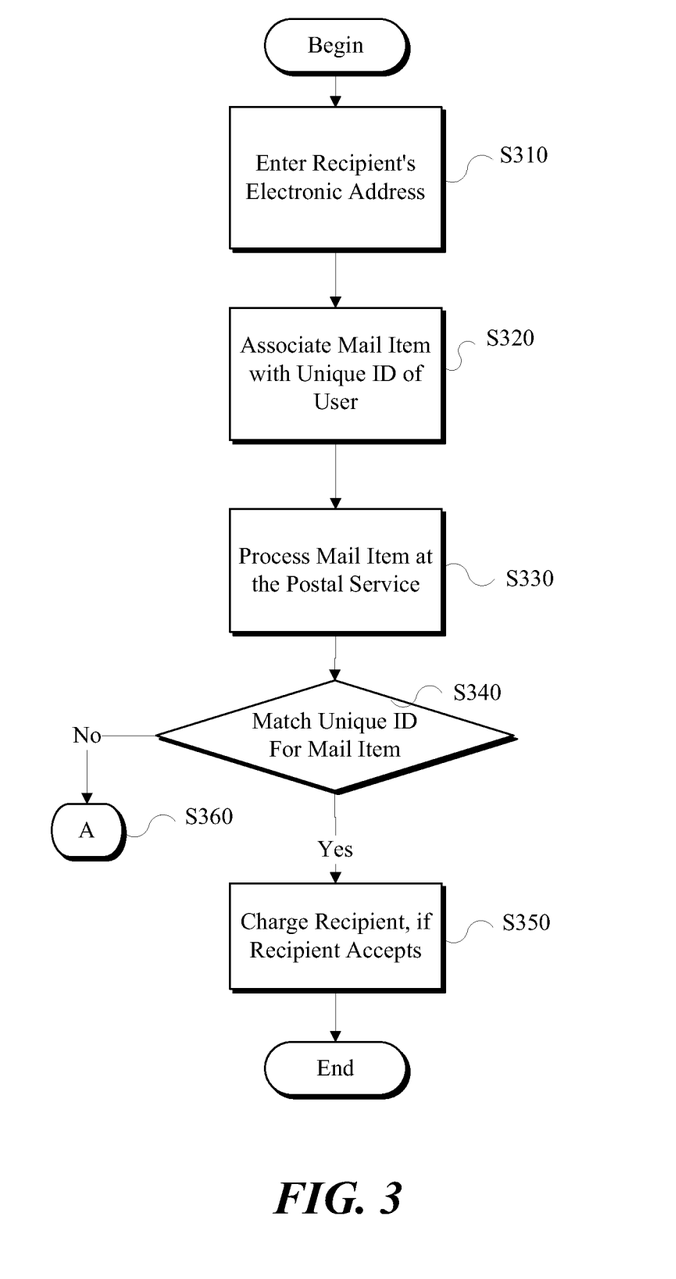
FIG. 3 is an exemplary flow diagram of a method of charging the recipient of a package, in accordance with one embodiment.

Referring to FIG. 3, a method in accordance with one or more embodiments is provided in which the recipient electronic address (e.g., email address, text messaging address, phone number, social media ID, etc.) is provided by the sender to the postal service, by way of interacting with the user app executed on computing system 110, for example, at the time the route information for the mail item is scanned by the user using computing system 110 (S310). As such, the mail item may be processed in the same manner as disclosed in FIG. 2 with the additional electronic address of the recipient having been provided and recorded in association with the calculated unique identifier for the mail item (and optionally along with the unique identifier associated with the user) (S320 to S340).

Depending on implementation, at some stage between the time the user provides the recipient's electronic address and the time the mail item arrives in the postal service processing center, a notification is forwarded to the recipient to determine whether the recipient would authorize the delivery costs to be charged to the recipient. If the recipient accepts the charges, then the charges are applied to the account of the recipient, provided that the recipient has a registered account with the postal service or a proxy, or alternatively if the recipient provides billing information (e.g., credit card number) when he accepts the charges (S350).

It is noteworthy that for the purpose of brevity, additional details such as identifying the class of delivery such as priority or expedited mail options are not discussed in full detail. Other options such as registered mail and delivery receipt requests are not discussed in full detail either. Such additional features and options provided by a postal service may be taken into account for the purpose of calculating the costs associated with delivering a mail item by the postal service and according to information provided by the sender at the time the sender utilizes the user app to scan the route information for the mail item. Such additional information may be stored in association with the unique identifier of the mail item (e.g., in storage device 140).

Thus, in one implementation, at the time the route information is scanned at the postal service center, the above noted data (e.g., the class of delivery and other delivery related details) entered by the user are retrieved and are taken into account for the purpose of calculating the fee that is to be charged to the user account for mailing a mail item. For example, if the user has interacted with the user app running on computing system 110 to indicate that the mail item is to be shipped with expedited shipping (e.g., next day delivery) and with a certificate of mailing provided to the user, then system software 124 at the postal office center calculates that additional charges related to the added options and bills the user accordingly. A return receipt and tracking information may be also forwarded to the user by way of electronic mail or other method of delivery (e.g., online mail box, social media, text messaging, etc.).

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
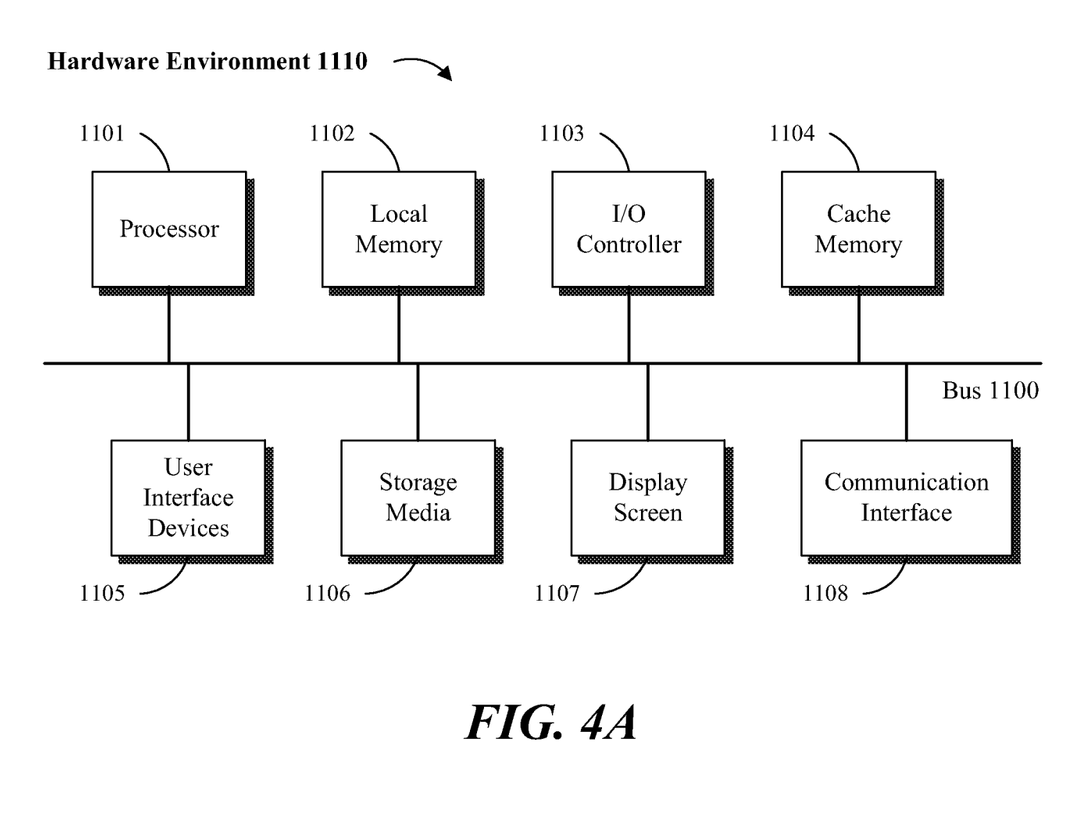
FIGS. 4A and 4B are block diagrams of hardware and software environments in which the disclosed systems and methods may operate, in accordance with one or more embodiments.
Figure 4B:
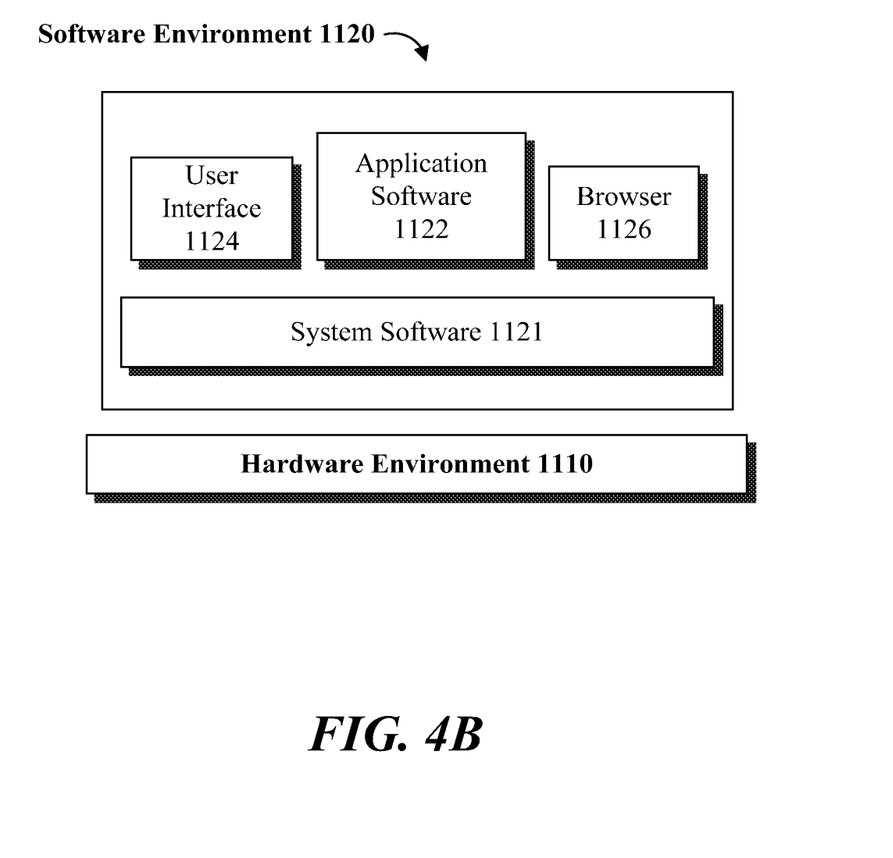

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for delivering mail items, the method comprising:
   scanning route information, prior to mailing a mail item by a sender, via user interaction with a user interface associated with an optical camera of a mobile communication device, wherein the route information consists of at least one of the sender's address or a delivery address, wherein at least one of the sender's address or the delivery address is physically placed on the mail item in the form of handwriting or alphanumerically printed letters;
   using a processor of the mobile communication device to generate a first unique identifier from the scanned route information, wherein the first unique identifier identifies the mail item;
   using a processor of the mobile communication device to recognize a second unique identifier associated with the mobile communication device used for scanning the route information, wherein the second unique identifier identifies a user account to which delivery charges associated with delivering the mail item are applied;
   using a processor of the mobile communication device to associate the first unique identifier and the second unique identifier so that having access to the first unique identifier as stored in a database provides access to the second unique identifier; and
   wherein the mail item is mailed with no prepaid postage, physically placed on the mail item,
   wherein the route information is displayed on a surface of the mail item such that the route information is readable by a scanning system at a postal service processing location after the mailing of the mail item by the sender,
   wherein processing mail at the postal service processing location comprises:
      receiving the mail item mailed by the sender and scanning the route information displayed on the surface of the mail item to calculate a third identifier by the scanning system at the postal service processing location;
      searching through records in the database to determining if a record in the database includes a match for the third identifier; and
      charging the user account identified by the second unique identifier based on an association between the first unique identifier and the second unique identifier and causing delivery of the mail item, in response to determining that a match for the third identifier is included in the database and the third identifier is equal to the first unique identifier.

2. The method claim 1, wherein the first unique identifier identifying the mail item is generated based on application of an algorithm to the route information, wherein the application of the algorithm to the route information results in generation of an identifier that uniquely identifies the main item from other mail items.

3. The method of claim 1, wherein the second unique identifier identifying the user account is calculated based on unique data associated with the mobile communication device.

4. The method of claim 3, wherein the unique data comprises a unique address associated with the mobile communication device.

5. The method of claim 3, wherein the unique data comprises a unique address associated with a communication component in the mobile communication device.

6. The method of claim 3, wherein the unique data comprises cookie data stored on the mobile communication device.

7. The method of claim 1, wherein a user of the mobile communication device is provided with an option to enter electronic address of a party responsible for paying for charges associated with mailing the mail item.

8. The method of claim 1, wherein the scanning, generating, recognizing and associating processes are performed by a software application running on the mobile communication device.

9. The method of claim 8, wherein the software application is an app downloaded to the mobile communication device, in response to a user interacting with the mobile communication device.

10. The method of claim 1, wherein the charges are calculated at the postal service processing location based at least on weight or measurement information of the mail item as determined after the mailing of the mail item, without the user of the mobile terminal being involved in the weighing or measuring the mail item, such that need for comparing the calculated charges at the postal service with value of a prepaid stamp or label that would have been otherwise attached by the sender to the mail item is obviated,
   wherein the route information is the only information scanned by the user of the mobile terminal from a surface of the mail item to generate the first unique identifier, and wherein the mail item is mailed with no prepaid postage and no scannable identifying indicia other than the route information physically placed on the mail item.

11. The method of claim 1, wherein the second unique identifier is associated with the user based on a unique identifier associated with the user or the mobile communication device including at least one of: a unique serial number of the communication device, unique data stored on storage media of the communication device, or a unique ID of a component installed or associated with the mobile communication device.

12. The method of claim 1, wherein at a time after scanning the route information via user interaction with the user interface associated with an optical camera of a mobile communication device and before the route information is read by the scanning system at a postal service processing location after the mailing of the mail item by the sender, the user account is charged for at least an initial amount.

13. A mobile communication device comprising:
   a mechanism for scanning route information, prior to mailing a mail item, wherein the route information consists of at least one of a sender's address or a delivery address;
   a logic unit for generating a first unique identifier from the scanned route information, wherein the first unique identifier identifies the mail item;
   a logic unit for recognizing a second unique identifier associated with the mobile communication device used for scanning the route information, wherein the second unique identifier identifies a user account to which delivery charges associated with delivering the mail item are applied;

a logic unit for associating the first unique identifier and the second unique identifier so that having access to the first unique identifier as stored in a database provides access to the second unique identifier; and wherein the mail item is mailed without prepaid postage or payment-associated indicia affixed to the mail item, wherein the route information is displayed on a surface of the mail item such that the route information is readable by a scanning system at a postal service processing location, wherein processing mail at the postal service processing location comprises:

scanning the route information displayed on the surface of the mail item to calculate a third identifier by the scanning system at the postal service processing location;

searching through records in the database to determining if a record in the database includes a match for the third identifier; and charging the user account identified by the second unique identifier based on the association of the first unique identifier with the second unique identifier; in response to determining that a match for the third identifier is included in the database and the third identifier is equal to the first unique identifier.

14. The mobile communication device of claim 13, wherein the first unique identifier identifying the mail item is generated based on application of an algorithm to the route information, wherein the application of the algorithm to the route information results in generation of an identifier that uniquely identifies the main item from other mail items.

15. The mobile communication device of claim 13, wherein the second unique identifier identifying the user account is calculated based on unique data associated with the mobile communication device.

16. The mobile communication device of claim 15, wherein the unique data comprises at least one of: a unique address associated with the mobile communication device, a unique address associated with a communication component in the mobile communication device, or cookie data stored on the mobile communication device.

17. The mobile communication device of claim 13, wherein a user of the mobile communication device is provided with an option to enter electronic address of a party responsible for paying for charges associated with mailing the mail item.

18. A computer program product comprising a non-transitory computer readable storage medium having a computer readable program, wherein the computer readable program when executed on a computer causes the computer to:

scan route information, for delivery of a mail item, using an optical camera of a mobile communication device, wherein the route information consists of at least one of a sender's address or a delivery address or both the sender's address and the delivery address;

generate a first unique identifier from the scanned route information, wherein the first unique identifier identifies the mail item;

recognize a second unique identifier associated with the mobile communication device used for scanning the route information, wherein the second unique identifier identifies a user account to which delivery charges associated with delivering the mail item are applied;

associate the first unique identifier and the second unique identifier so that having access to the first unique identifier as stored in a database provides access to the second unique identifier; and wherein the mail item is mailed without prepaid postage or charge code affixed to the mail item; wherein the route information is displayed on a surface of the mail item such that the route information is readable by a scanning system at a postal service processing location, wherein processing mail at the postal service processing location comprises:

scanning the route information displayed on the surface of the mail item to calculate a third identifier by the scanning system at the postal service processing location;

searching through records in the database to determining if a record in the database includes a match for the third identifier; and charging the user account identified by the second unique identifier based on the association of the first unique identifier with the second unique identifier, in response to determining that a match for the third identifier is included in the database and the third identifier is equal to the first unique identifier.

19. The system of claim 18, wherein the first unique identifier identifying the mail item is generated based on application of an algorithm to the route information, wherein the application of the algorithm to the route information results in generation of an identifier that uniquely identifies the main item from other mail items.

20. The system of claim 18, wherein the second unique identifier identifying the user account is calculated based on unique data associated with the mobile communication device, wherein the unique data comprises at least one of: a unique address associated with the mobile communication device, a unique address associated with a communication component in the mobile communication device, or cookie data stored on the mobile communication device.

* * * * *